W. H. BERDAN.
Horse Hay-Fork.
No. 87,902. Patented March 16, 1869.
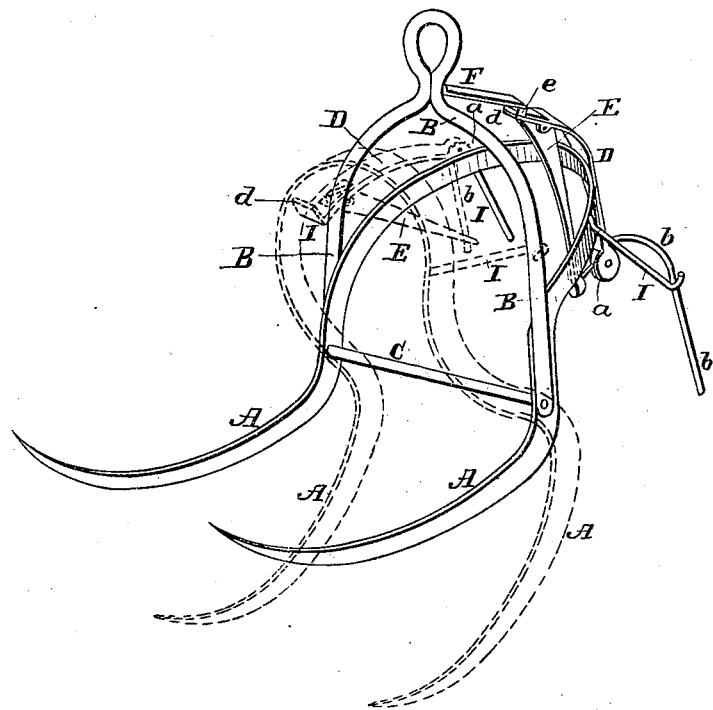

WILSON H. BERDAN, OF YORK, MICHIGAN.

Letters Patent No. 87,902, dated March 16, 1869.

IMPROVEMENT IN HORSE HAY-FORKS.

The Schedule referred to in these Letters Patent and making part of the same.

*To all whom it may concern:*

Be it known that I, WILSON H. BERDAN, of York, in the county of Washtenaw, and in the State of Michigan, have invented certain new and useful Improvements in Horse Hay-Forks; and do hereby declare that the following is a full, clear, and exact description thereof, reference being had to the accompanying drawings, and to the letters of reference marked thereon.

The nature of my invention consists in the construction and general arrangement of a "horse hay-fork," as shown in the drawings, and which will be hereinafter fully set forth.

In order to enable others skilled in the art to which my invention appertains, to make and use the same, I will now proceed to describe its construction and operation, referring to the annexed drawings, which form a part of this specification, and which represent a perspective view of the fork, showing the position of the same while the hay is being hoisted, and also, in red lines, the position of the hook while the hay is being discharged.

A A represent the two tines of the fork, which are made from one piece of metal, bent in the form of a bow.

The fork is so hung upon a bail, B, that its weight alone will cause the tines to point downward, thus discharging itself.

Through the lower ends of the bail B passes a brace, or axle, C, said brace first passing through the tines A A, thus joining the fork to the bail, strengthening the fork, and keeping the tines from spreading.

On the upper side of the bow of the fork is secured a curved bar, D, which constitutes the main part of the latch.

This curved bar is, at its lower end, provided with a pulley, $a$, over which the trip-rope $b$ passes.

The upper end of the bar D has a flange, $d$, pointing upward, near which flange the bar is slotted, and on each side of said slot, on the under side, an ear, $c$, projects.

Between these ears $c\ c$, the pallet E, or secondary part of the latch, is pivoted.

The end of the pallet E, where it is pivoted between the ears $c\ c$, is so notched, that the end of the pallet strikes and rests against the under side of the bar D, while a portion thereof projects through the slot on the bar, a suitable distance above the same.

To the lower end of the pallet E, the tripping-rope $b$ is secured.

The pallet should be so constructed that its weight alone will cause the front end to project through the slot in the bar D, as above described.

From the upper rear portion of the bail B, an arm, F, projects, said arm being, at its outer end, provided with a flange, $e$, which extends downward.

To load the fork, insert the tines A A into the hay, and pull the bail B over toward the point of the tines till the arm F slides along the curved bar D until it passes the end of the pallet E, which projects through the slot in the bar D. The weight of the pallet E then causes the lower end to drop down, when the arm F is held by its flange $e$ between the flange $d$ of the bar D and the projecting end of the pallet. The fork, with its load of hay, is then hoisted up, the hoisting-rope being attached to the upper end of the bail B.

After the hay has been drawn up, it is discharged from the fork as follows:

The latch, or trip-cord, $b$, is pulled, which draws the lower end of the pallet E up nearly parallel with the bar D. This causes the end of said pallet which projects above the bar D, to sink below, or even with the upper surface of said bar, which allows the arm F to slide along the upper surface of the bar D, causing the fork to disengage itself, as represented by red lines in the drawings.

The whole fork is made of metal, and there is no nut, bolt, or spring in it to get out of order, as is often the case in other hay-forks.

From the sides of the bow of the fork extend hooks, I I, which, when the fork is discharging itself, catch on the bail B, preventing the fork from turning over.

Having thus fully described my invention,

What I claim as new, and desire to secure by Letters Patent, is—

In combination with the tines A A and bail B, the slotted bar D, with its pulley $a$ and flange $d$, the pivoted pallet E, arm F, with its flange $e$, and the hooks I I, all constructed and arranged to operate substantially as and for the purposes herein set forth.

WILSON H. BERDAN.

Witnesses:
S. O. STACY,
A. D. STACY.